Jan. 15, 1924.
W. H. ROBINSON
PLANT SUPPORT
Filed June 10, 1921    2 Sheets-Sheet 1
1,480,917
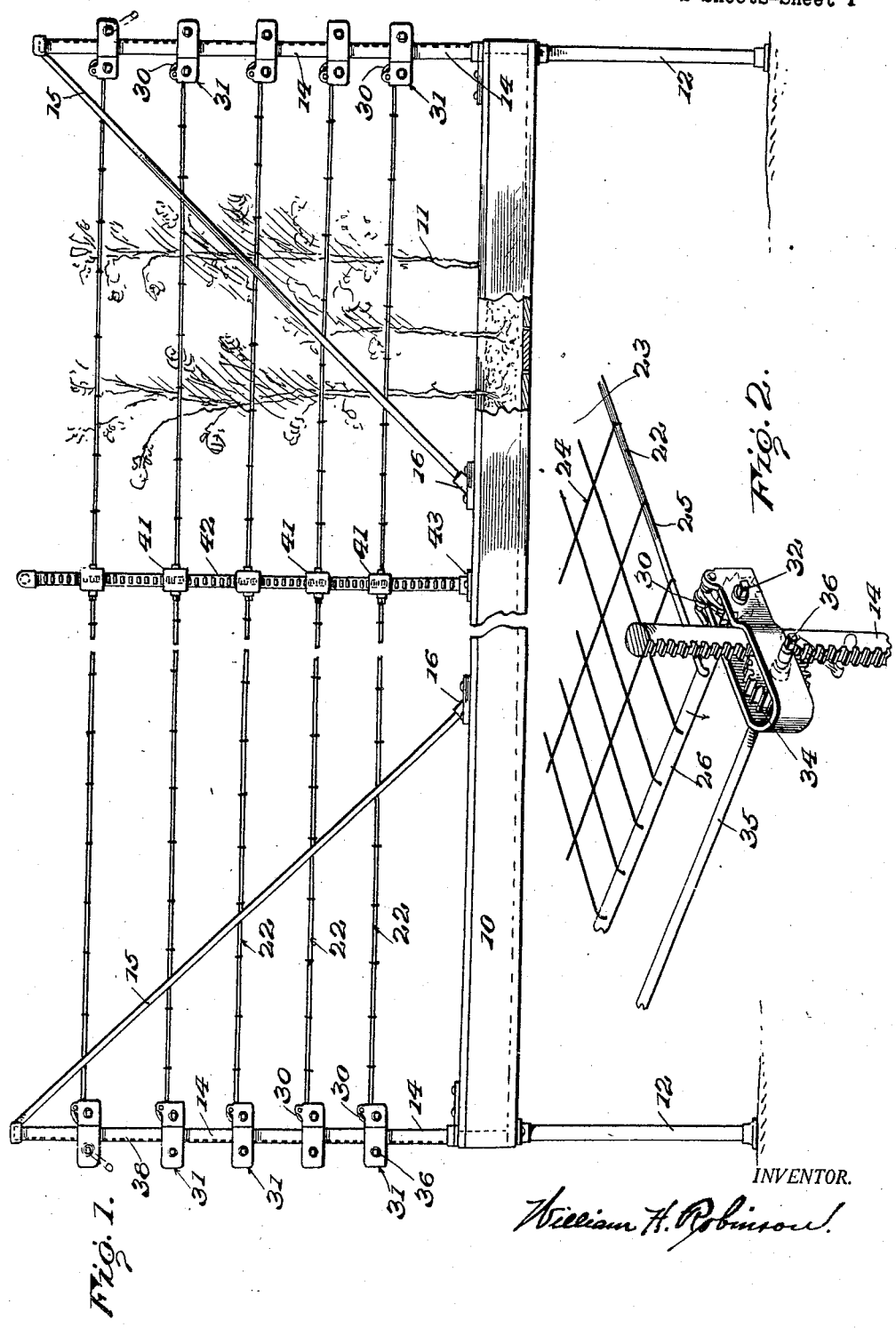
INVENTOR.
William H. Robinson Jan. 15, 1924.  
W. H. ROBINSON  
PLANT SUPPORT  
Filed June 10, 1921  
1,480,917  
2 Sheets-Sheet 2
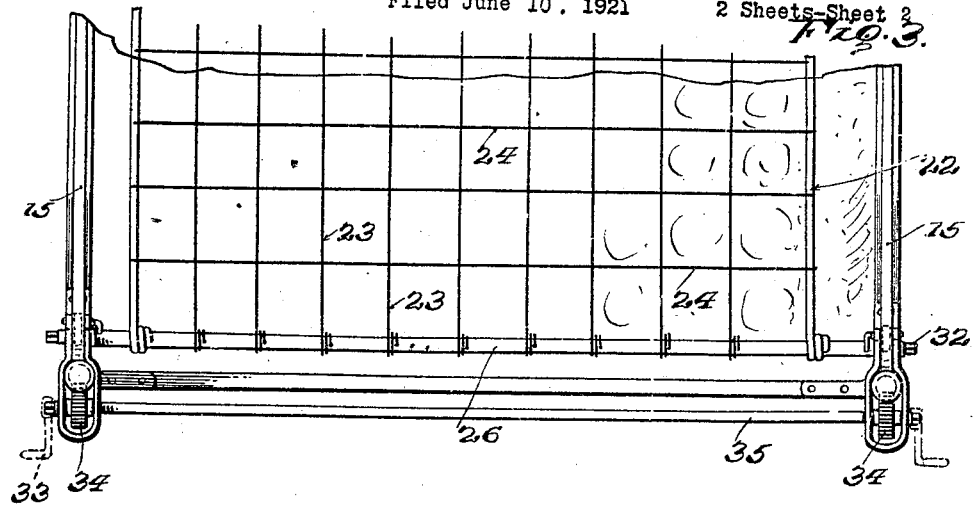
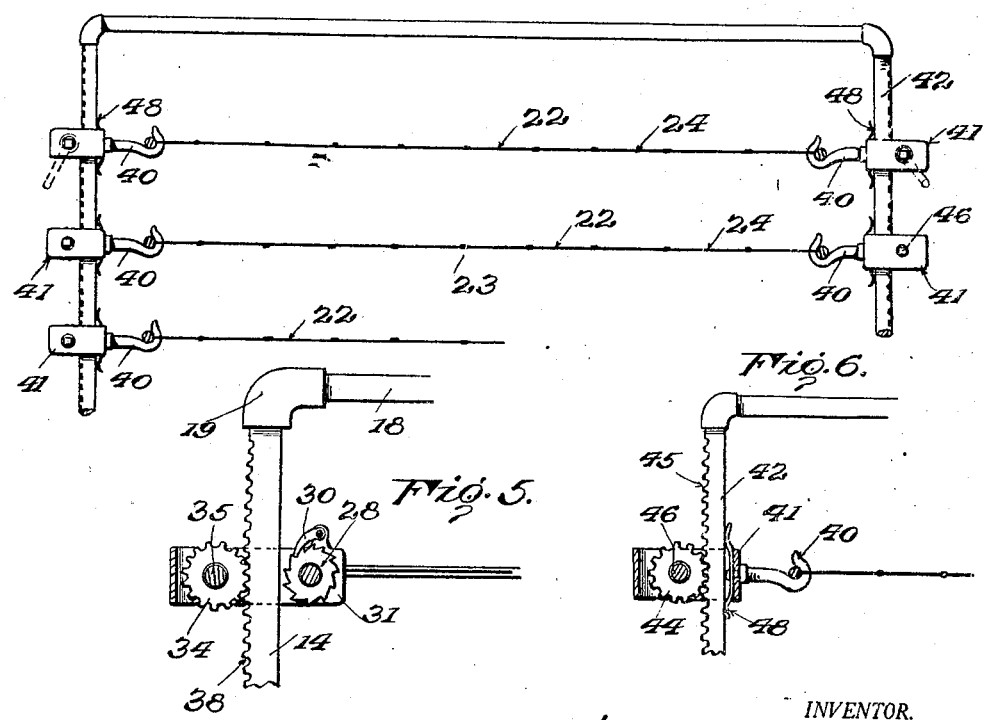
INVENTOR.  
William H Robinson.

Patented Jan. 15, 1924.

1,480,917

UNITED STATES PATENT OFFICE.

WILLIAM H. ROBINSON, OF MAYWOOD, ILLINOIS.

PLANT SUPPORT.

Application filed June 10, 1921. Serial No. 476,426.

*To all whom it may concern:*

Be it known that I, WILLIAM H. ROBINSON, a citizen of the United States, residing at Maywood, in the county of Cook and State of Illinois, have invented certain new and useful Improvements in Plant Supports, of which the following is a specification.

This invention relates to plant supports especially adapted for use in hothouses though not necessarily restricted to such use.

In the raising of hothouse plants it is customary to support the stems of the plants by means of longitudinal and transverse strings or wires which are secured to the bed at the expenditure of much time and effort on the part of the florist. Also, in adjusting the longitudinal and transverse strings or wire, the bud-bearing stems are frequently damaged.

It is therefore an important object of this invention to provide a plant support in the nature of a wire frame which may be bodily raised to adjust itself to the plants during the various periods of its growth.

Also, the invention aims to provide novel means whereby the tension of the frame may be regulated.

A further object is to provide a plant support which is simple to operate, efficient in use and cheap to manufacture.

In the accompanying drawing:—

Figure 1 is a fragmentary side elevation of the improved plant support applied.

Figure 2 is a fragmentary perspective of the support.

Figure 3 is a fragmentary plan view of the support.

Figure 4 is a fragmentary elevation of an intermediate brace embodied in the invention.

Figure 5 is a detail sectional view illustrating the adjusting means for one of the frames.

Figure 6 is a detail view partly in section illustrating the means for bracing the intermediate portion of the frame.

In the drawing, the numeral 10 indicates the usual bed or table which contains a quantity of soil in which plants 11 of any variety are planted, the said bed or table being supported by means of legs 12.

The invention aims to provide novel means whereby the stems of the plants may be prevented from drooping as the same grow and to this end I have provided a pair of standards 14 at each end of the bed and have braced the standards by inclined bracing rods 15 secured at their lower ends to the bed as indicated at 16. Each pair of standards 14 are connected by a cross rod or bar 18 having its ends connected to elbows 19 threaded on to the upper ends of the standards 14.

The standards 14 which are rigidly secured to the ends of the bed form a supporting means for frames generally designated by the numeral 22. As illustrated in Figure 2, each frame 22 consists of longitudinal and transverse wires 23 and 24 respectively, the said wires being crossed to define openings through which the stems of the flowers pass so that the stems will be supported in the desired position. The transverse wires 24 are connected at their ends to comparatively stout side wires 25, while the longitudinal wires 23 are connected at their ends to rotatable shafts 26. Each end portion of each shaft is provided with a ratchet wheel 28 engaged by a pawl 30 pivoted to a gear casing 31 which receives the standards 14. The end of the shaft 26 is squared as indicated at 32 to form an attaching means for a crank 33 by means of which the shaft 26 may be rotated for tensioning the frame. The frame may be adjusted from either end by means of gears 34 keyed or otherwise secured to transversely extending shafts 35 having their ends squared as indicated at 36 for engagement with an operating crank by means of which the shafts may be manually rotated. As illustrated in Figure 5, the pairs of gears 34 have engagement with teeth 38 formed on the outer sides of the standards 14 whereby the rotation of one of the shafts will result in the vertical movement of that end of the frame. As the gears 34 are located at the outer sides of the standards 14 the weight of each frame will hold the gears 34 constantly in mesh with the racks formed by the teeth 38. One end of the frame may be moved vertically entirely from one side of the flower bed since the shaft 35 causes the gears 34 mounted thereon to operate in unison.

The intermediate portion of each frame of which there may be any desired number is braced by means of oppositely arranged hooks 40 extended inwardly from casings 41 which receive standards 42 secured to the intermediate portion of the bed as indicated at 43. Each casing 41 is provided with a gear 44 meshing with a series of teeth 45 on the adjacent standard. When the shaft 46 which supports the gear 44 is manually rotated by crank or otherwise, the gear 44 is rotated for moving the casing 41 vertically. A longitudinally curved leaf spring 48 is confined between one end of each casing and the adjacent side of the standard 42 to hold the gear 44 in mesh with the teeth 45. The hook 40 is of course engaged with the intermediate portion of one of the frames so as to prevent sagging thereof.

In use the several frames may be adjusted as the plants grow and the operator is not required to handle the several stems or to place the longitudinal and transverse wires separately. The frames may be brought into use when desired and may be operated entirely by one man.

With reference to the foregoing description it will be apparent that the invention forming the subject matter of this application not only properly braces the stems of the plants but also results in a substantial saving of time and material.

I claim:—

1. A plant support comprising a bed having supporting legs at each corner, a standard mounted at each corner and on the sides and ends of same, each of said standards being provided on one side with rack teeth for its entire length, and a series of frames comprising longitudinal and transverse wires supported in spaced relation above the bed and by the standards.

2. In a plant support comprising a bed having supporting legs at each corner, a standard mounted at each corner and on the sides and ends of same, each of said standards being provided on one side with rack teeth for its entire length, a series of frames comprising longitudinal and transverse wires supported in spaced relation above the bed, a U-shaped gear casing attached to each corner of each frame, a pair of gears journaled in spaced relation in each of the gear casings, a standard adapted to pass through each of said gear casings and between the gears journaled therein, one of said gears engaging said rack teeth of the standard, and means for operating said gear into mesh with said rack teeth for elevating the series of frames at any spaced height above the bed.

In testimony whereof, I have affixed my signature in the presence of two witnesses.

WILLIAM H. ROBINSON.

Witnesses:
JOSEPH H. BAILEY,
MIRIAM BAILEY ROBINSON.